April 22, 1941.   O. E. SZEKELY   2,239,129
TRANSMISSION SYSTEM
Filed Feb. 28, 1939   3 Sheets-Sheet 1
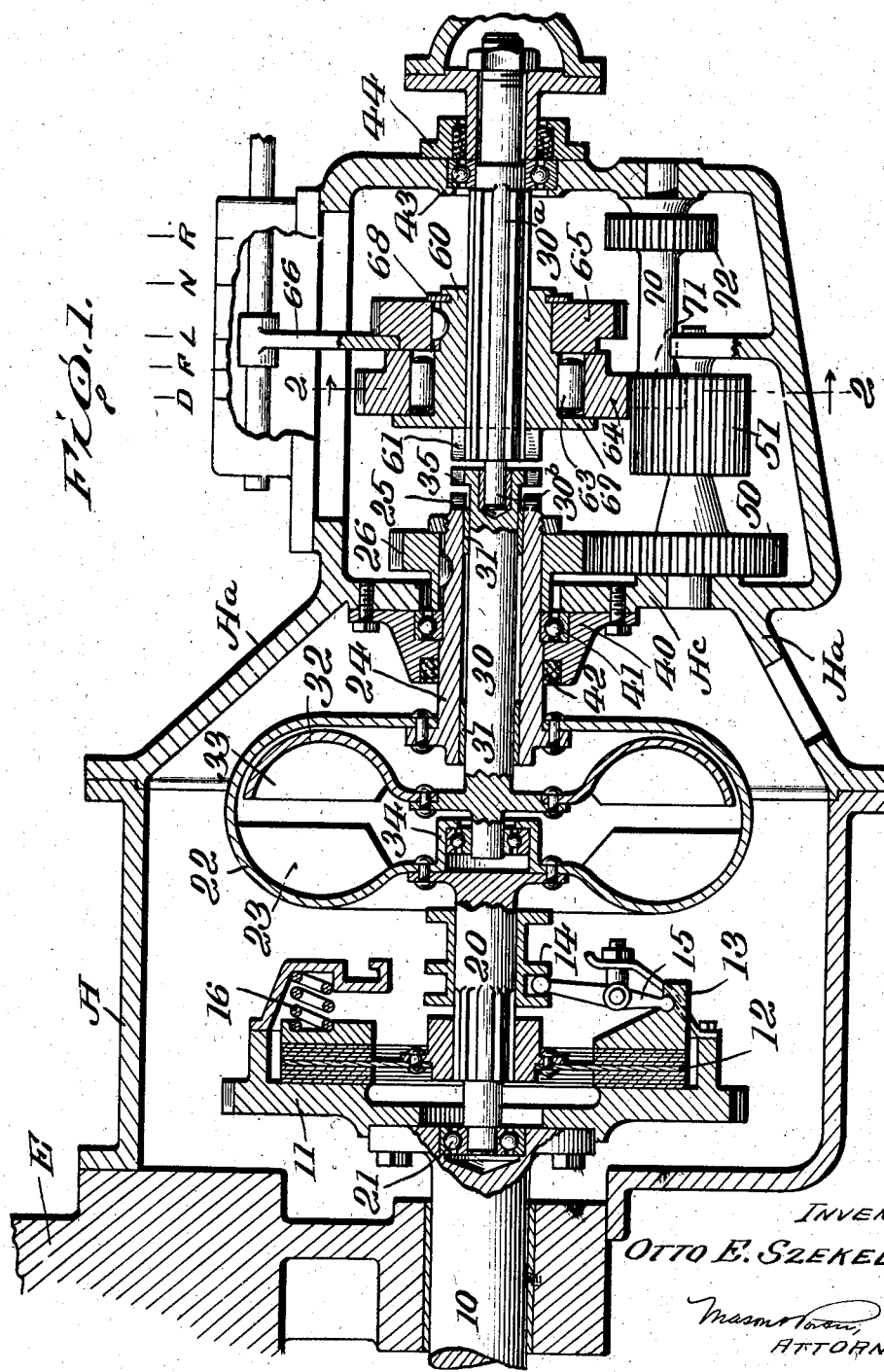
INVENTOR
*Otto E. Szekely*
ATTORNEYS

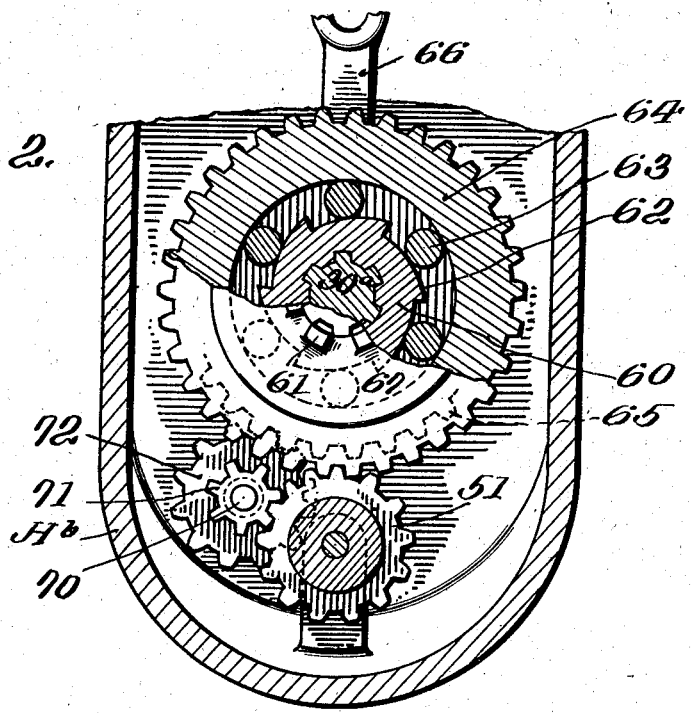
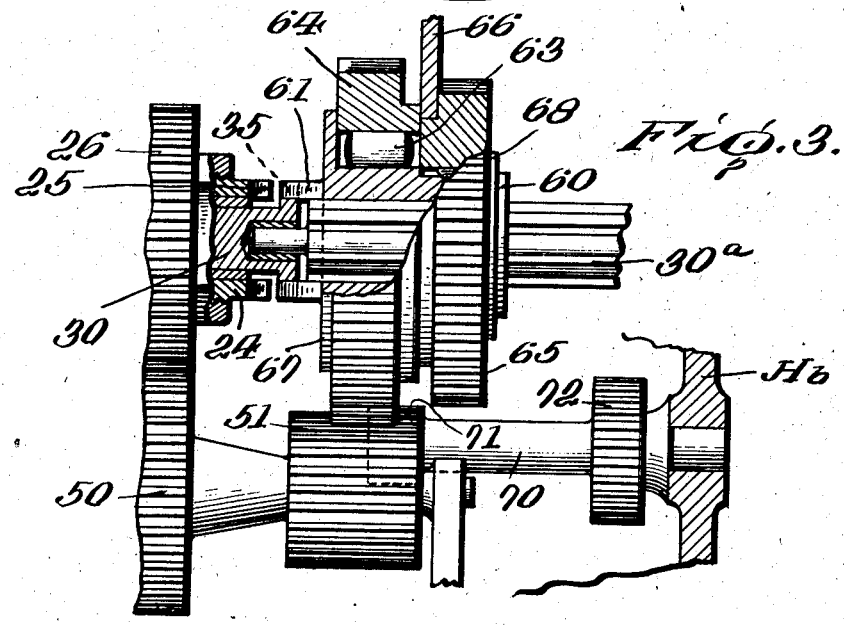

April 22, 1941.  O. E. SZEKELY  2,239,129
TRANSMISSION SYSTEM
Filed Feb. 28, 1939  3 Sheets-Sheet 3
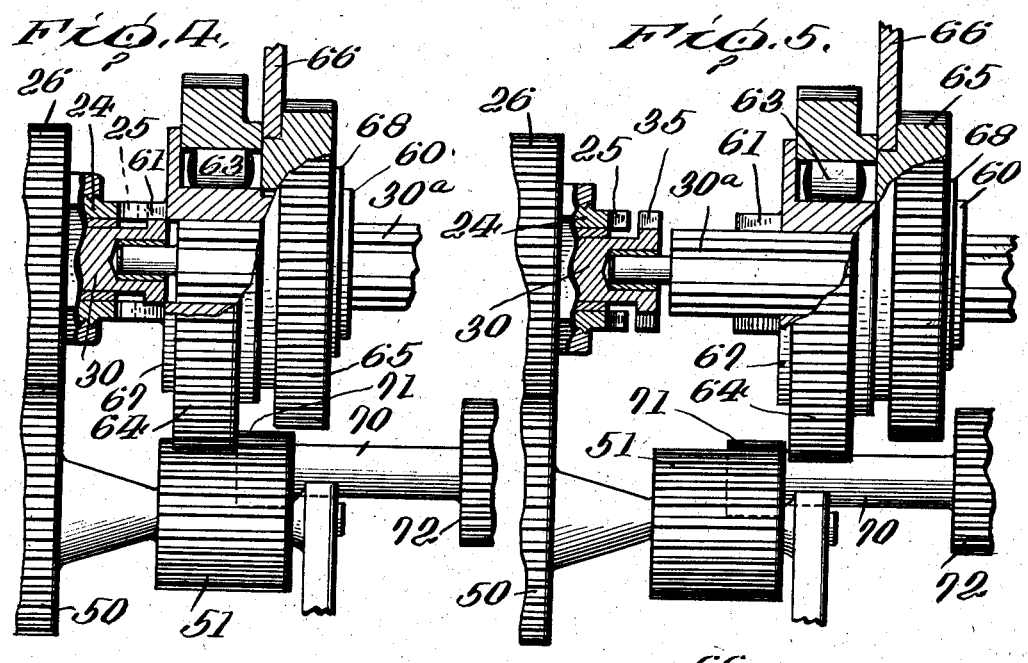
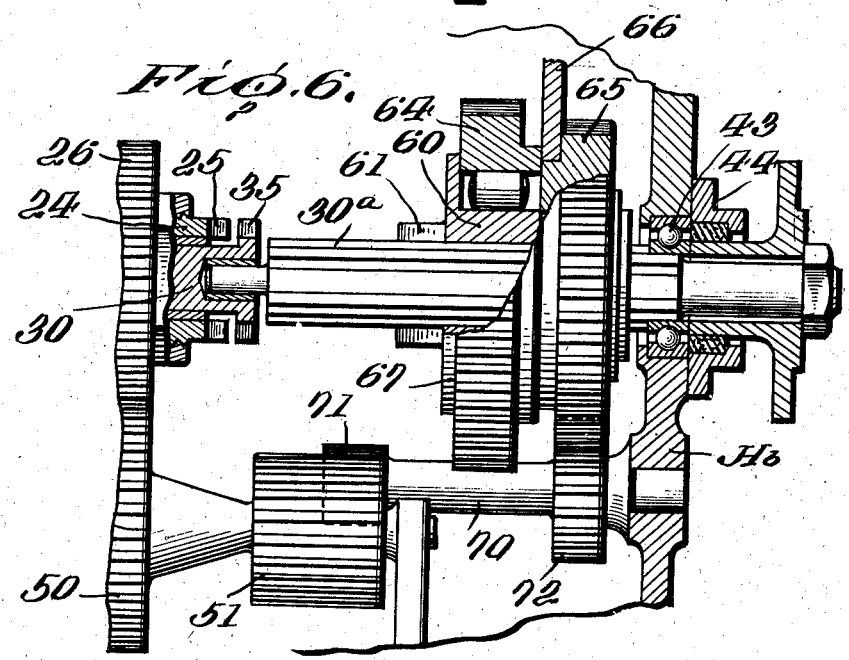
INVENTOR
OTTO E. SZEKELY
ATTORNEYS Patented Apr. 22, 1941

2,239,129

UNITED STATES PATENT OFFICE 2,239,129

TRANSMISSION SYSTEM

Otto E. Szekely, Philadelphia, Pa., assignor to Szekely Company, Inc., Philadelphia, Pa., a corporation of Pennsylvania Application February 28, 1939, Serial No. 259,034

11 Claims. (Cl. 74—189.5)

This invention relates to systems for transmitting power from a motor or like source to a load.

My co-pending application 753,755, filed November 19, 1934 (now United States Letters Patent 2,151,722), of which the present application is a continuation in part, discloses and claims a transmission system in which a high-torque, low-speed ratio train is effective for producing a movement of the load through an over-running clutch device; while a variable ratio transmission capable of operating at various conditions between the high-torque and low-speed ratio and a direct drive condition was provided, with the inclusion of a differentiating gearing which was under control of a braking means for determining the variable ratio of drive therein.

One of the features of the present invention is the provision of means by which a plurality of ratios of transmission are provided for driving the load in one direction, including a high-torque and low-speed ratio means effective for causing the load to move when the load demand is high and a high-speed low-torque ratio effective for causing the load to move when the torque demand of the load is substantially equivalent to the torque output of the motor, together with a fluid fly-wheel and devices associated therewith for controlling the transition from the high-torque to the low-torque condition of operation.

Another feature of the invention is the provision of a system for transmitting power, including a selector member which is effective in one position for producing a high-torque low-speed ratio at high-torque demand of the load and for producing a low-torque high-speed ratio when the torque demand of the load is low, and which is effective in a second position for disconnecting the load from the motor, and in a third position for producing a reverse driving of the load, together with a fluid fly-wheel which is effective when the selector is in the first position for producing a transition from the high-torque to the low-torque ratio condition.

A further feature of the invention is the provision of a system for transmitting power from a motor which must be maintained at above a predetermined minimum speed, including devices for automatically converting the system from a high-torque ratio to a low-torque ratio one in accordance with torque demand of the load, and including means for disconnecting the motor from the load, and for obtaining a reverse drive.

With these and other features as objects in view, as will appear from the following specification and claims, an illustrative form of practicing the invention is shown in the accompanying drawings, in which:

Figure 1 is a diametrical upright sectional view through a transmission embodying the present invention;

Figure 2 is a transverse upright sectional view substantially on line 2—2 of Figure 1;

Figure 3 is a detail view of a part of Figure 1, showing the parts in position for automatically selective driving;

Figure 4 is a view corresponding to Figure 3, but showing the parts in position for direct drive;

Figure 5 is a similar view, with the parts in a neutral or non-driving position;

Figure 6 is a similar view, showing the parts in position for driving in the reverse direction.

In the drawings, the drive shaft 10 is energized by a suitable motor such as an internal combustion engine, etc., (having the frame of which a part E is shown), and is connected to the disk or fly-wheel 11 which forms a part of a normal clutch system such as is employed in automobiles, this clutch also including the shiftable clutch plate 12 and the pressure member 13 which can be moved axially toward the right, for effecting a disengagement at the clutch, by axial movement of the conventionally-shown fork sleeve 14 and the actuating levers 15, but which is normally held pressed toward the left, or toward engagement position by springs 16 in the usual way.

An intermediate shaft 20 is supported at its end by anti-friction bearings 21 within the driving shaft 10, and the other end is connected to the driver housing 22 of a fluid fly-wheel which is provided internally with the usual vanes 23. This fluid fly-wheel housing 22 is connected to a hollow shaft 24 which is provided at its other end with jaw-clutch teeth 25, and has keyed thereto a gear 26.

The driven shaft 30 is supported within the hollow shaft 24 by the bearings 31 and is connected to the runner 32 of the fluid fly-wheel, which has the usual vanes 33 therein for cooperation with the vanes 23 of the driver 22. The left-hand end of the shaft 30 in the drawings is supported by an anti-friction bearing 34 carried in the fluid fly-wheel housing 22. The right-hand end of the shaft 30 is provided with a ring of clutch teeth 35 which are equal in number and arrangement and in radial dimensions to the clutch teeth 25. This end of the shaft 30 also is hollowed out to receive the anti-friction bearings 30b for supporting the reduced end of the tail shaft 30a.

These structures are supported within a housing composed of the portion H which is secured to the frame structure E of the motor, and at the other end the housing H is secured to a tapered housing structure Ha formed integrally with a gear box Hb at the right-hand end thereof (Figure 1). The partition wall Hc at the left-hand end of the gear box Hb is provided with a disk structure 40 which receives an anti-friction bearing 41 for supporting the hollow shaft 24, and also an oil seal 42. The right-hand end wall of the gear box Hb receives an anti-friction bearing 43 for the load shaft 30a, and also a further oil seal 44.

Within the gear box is rotatably mounted a gear member having the large gear 50 and the small gear 51. The large gear 50 is constantly in mesh with the gear 26 connected to the driver 22, and thus is constantly driven while the clutch 11, 12, 13 is engaged and the motor is running.

The load shaft 30a has a splined portion which receives a selector member having a body 60 with an internal spline for sliding engagement on the splined tail shaft 30a. The left-hand end of the body 60 has jaw-clutch teeth 61. The body 60 also has cam surfaces 62 (Figure 2) for engagement with rollers 63 which coperate with the inner surface of a gear ring 64 having external teeth which are in meshing engagement with the small gear 51 when the selector is in a left-hand or "forward" position. The body 60 also has a gear 65 keyed thereto. A shifting fork 66 engages between the gear ring 64 and the gear 65 and can be actuated to slide the body 60 axially along the splined tail shaft 30a. The body 60 has a flange 67 at one end for preventing axial movement of the gear ring 64, and a snap ring 68 engages the groove of the body 60 for preventing axial movement of the gear 65. In the illustrated form, at the extreme left-hand position of movement of the body 60, the jaw-clutch teeth 61, 25, and 35 are in engagement and a direct drive is produced: the position of the fork, in this condition, is designated by "D". In second or "forward" position, designated by "F", the gear ring 64 is in engagement with the gear 51, and the clutch teeth 61 are engaged with clutch teeth 35 and disengaged from clutch teeth 25. In a third position for a low ratio mechanical drive (marked "L" in Figure 1) and representing the parts in the full-line positions of Figure 1, the clutch teeth 61 have been disengaged from the clutch teeth 25 and 35 while the gear ring 64 remains in engagement with the gear 51. In a fourth position, designated by "N", the gear ring 64 has been moved to the right (Figure 1) and out of engagement with the gear 51, while the gear 65 is still out of engagement with its corresponding reverse gear. Finally, in a fifth position, designated by "R", the gear 65 has been moved so far to the right that it is engaged with the reverse gearing structure.

This reverse gearing structure comprises a shaft 70 supported in the gear box Hb and having a gear 71 which is constantly in mesh with the gear 51, and also having a gear 72 which is engaged by the gear 65 when the body 60 is in the "R" position.

The operation of the structure is as follows:

If it be assumed that the device is employed as a transmission for an automobile having an internal combustion engine of the usual type, the depression of the usual clutch pedal will disengage the clutch 11, 12, 13, and the engine turns free and may be started in the usual way. With the shifting fork 66 in the "N" position, as shown in Figure 5, the mechanical drive through gears 26, 50 and 51, 64 is interrupted, and also the mechanical drive through the clutch teeth 25, 35, 61 is disconnected, so that no mechanical or other drive can be effectuated to the tail shaft 30a. When the shifting fork 66 is in the "L" position, as shown in Figure 1, a mechanical drive at low speed and high torque ratio is accomplished from the motor shaft 10, from the engaged clutch assembly, the housing 22, shaft 24, gear 26, gear 50, gear 51, gear ring 64, through the rollers 63 to the clutch surfaces 62, the body 60, and the splined tail shaft 30a: This represents a low speed and high torque ratio of mechanical drive, and occurs independently of any movements of the fluid fly-wheel. With the shifting fork 66 in the "F" position, as shown in Figure 3, the engagement of the clutch 11, 12, 13, produces rotation of the shaft 20, the driver 22, the gear 26, and therewith of the gears 50, 51, and the gear ring 64, as in the "L" position.

At the same time, the engagement of clutch teeth 61 and 35 causes the tail shaft 30a to drive the shaft 30, and the runner 33 is brought toward a speed corresponding to that of the tail shaft 30a, which is less than engine speed. The action in the fluid fly-wheel is a function of the engine velocity, as it depends upon centrifugal force and rapidity of relative movement of parts. Hence, at a high engine speed, under these conditions, energy is transferred from the driver 22 to the runner 32 and some power transfer is thus accomplished to the shaft 30, and thence directly to the tail shaft 30a through the clutch teeth 61, 35, but it will be noted that this transfer is being accomplished without any change in torque ratio, and that the actual transfer is low, with the usual fluid fly-wheel, when the engine speed is low.

When the clutch fork 66 is in the "D" position, as shown in Figure 4, a direct mechanical drive is accomplished from the clutch teeth 25 to the clutch teeth 61, so that the selector body 60 and tail shaft 30a turn at the same speed as the housing 22. Likewise, the clutch teeth 61 serve to hold the clutch teeth 25 so that the runner 32 turns at the same speed as the housing 22. Under these conditions, the selector body 60 turns faster than the gear ring 64, this being permitted by the clutch rollers 63 in their engagement with the surfaces 62, and a similar condition will prevail when the parts are in the "F" position and the torque demand on the tail shaft 30a is being satisfied by the torque delivery to the runner 32 from the housing 22 in the fluid fly-wheel.

Assuming that the automobile has been going up a steep hill under the low-speed and high-torque ratio produced by the aforesaid gearing when the parts are in the "F" position, and now comes to a level road or lesser grade at which the load demand upon the tail shaft 30a is mechanically equivalent to the torque output of the engine at its prevailing speed, the fluid fly-wheel now becomes capable of transmitting this torque, without the multiplication which has heretofore been necessary, and the necessary transmission can now be effected in the fluid fly-wheel alone, as the effort being exerted therein is sufficient for the purpose. In particular, it will be understood that the normal characteristic of an internal combustion engine, when the load decreases, is for an increase of speed to occur, and this in turn results in a greater transfer of effort at the fluid fly-wheel.

The result of this is that the runner 32 comes up to substantially the speed of the driver 22, with a relatively small slippage which is a function of the engine speed, etc. This speed of the runner, however, is greater than the speed which would be imparted to the tail shaft 30a through the gear reduction, and hence this gear reduction train is unloaded of its duty of transferring power, as the body 60 turns within the gear ring 64 as the clutch rollers 63 permit the over-running effect to occur.

As the engine speed and the speed of the tail shaft 30a become correlated, ultimately the relative movements are very slow, and the clutch fork 66 may be moved into the "D" position, so that a direct drive is now produced from the shaft 10, through the clutch 11, 12, 13, the driver body 22, the hollow shaft 24, the teeth 25, 61, and body 60, to the shaft 30.

If the automobile comes to a further ascending grade, and the engine begins to labor, the operator can momentarily close the engine throttle to lower the speed to reduce the load being transferred at the teeth 25, 61, and move the shifting fork 66 back to the "F" position. On again increasing the speed of the engine, the slippage will occur within the fluid fly-wheel, and a drive will be accomplished through the gearing, and with the torque-ratio increase as before.

It will thus be noted that the positions "D" and "L" respectively represent a mechanical direct drive and a mechanical low speed drive, while the position "F" represents a connection of the parts by which the speed ratio will shift automatically in accordance with load demand from the low limit established by the gear ratio train to the high ratio of direct drive or vice versa. It will be understood that a similar effect can be obtained by leaving the transmission in the "F" position for the entire time of travel, although this usually results in a selective operation in the system which depends on load demand and also on the engine torque as being currently delivered at the particular throttle opening.

When it is desired to disengage the load from the driving system, the clutch fork 66 is moved to the "N" position, and then the aforesaid gearing and the clutch teeth are entirely disconnected.

When it is desired to travel in a reverse direction, the clutch fork 66 is moved to the "R" position, as shown in Figure 6, in which the gear 68 is engaged with the gear 72. A drive now occurs from the shaft 10, through the clutch 11, 12, 13, to the shaft 20, the driver 22, hollow shaft 24, gear 26, gear 50, gear 51, gear 71, gear 72, gear 65, and the tail shaft 30a is turned in the reverse direction.

It is obvious that the invention can be practiced in many ways, without departing from the scope of the appended claims.

I claim:

1. A transmission system comprising a driving member, a driven member, a fluid fly-wheel having two relatively movable parts of which one is connected to the driving member, selectively engageable means effective in one position for connecting the driven member directly to the driving member and effective in another position for connecting the other part of the fly-wheel to the driven member, and a low-speed high-torque train connecting the driving and driven members and including an over-running clutch for permitting the driven member to turn faster than the drive relationship through said train when the torque demand upon the driven member is not greater than the torque transfer through the fluid fly-wheel.

2. A transmission system comprising a separable clutch structure and means to drive one part of said clutch structure, a driving member connected to another part of said clutch structure to be driven thereby, a driven member, a fluid fly-wheel having two relatively movable parts of which one is connected to the driving member and the other is connectable to the driven member, a first small gear on said one part of the fluid fly-wheel, a first large gear in mesh with the first small gear, a second small gear connected to said first large gear for rotation therewith, a large ring gear in mesh with said second small gear, a selector body connected for rotation with said driven member and slidable therealong, said second small gear being wide whereby the ring gear remains in mesh therewith in a plurality of axially-slid positions, over-running clutch rollers located between said selector body and ring gear whereby a power transfer at low speed may be effected from said driving member to said driven member and whereby the selector body may turn faster than the ring gear, clutch means on said selector body selectively cooperative with clutch means on said driving member and on the other part of the fluid fly-wheel while said body is in selected ones of said plurality of positions, and means for shifting the selector body for moving said ring gear along and out of engagement with said second small gear.

3. A transmission system comprising a driving member, a driven member, a fluid fly-wheel having a driver casing housing connected to the driving member and having a runner connectable to the driven member, a low-speed high-torque gear train including a small gear connected to the driver housing and also including an over-running clutch for permitting the driven member to turn faster than the drive relationship through said train when the torque demand upon the driven member is not greater than the torque transfer through the fluid fly-wheel, and selectively engageable means for selectively connecting the driven member to said runner and to said driving member.

4. A transmission system comprising a driving member, a driven member, an intermediate member, a fluid fly-wheel having two relatively movable parts of which one is connected to the driving member and the other is connected to the intermediate member, a low-speed high-torque train connecting the driving and driven members and including an over-running clutch for permitting the driven member to turn faster than the drive relationship through said train when the torque demand upon the driven member is not greater than the torque transfer through the fluid flywheel, and means for selectively coupling said driven with the driving and intermediate members including a selector body and engageable clutch teeth on said body and on the driving and intermediate members.

5. A transmission system as in claim 4, including also a reverse gearing driven from the driving member and selectively engageable for actuating the driven member, said selective coupling means and the selectively engageable reverse gearing being interconnected so that the two may not be in coupling engagement at the same time.

6. A transmission system comprising a driving member, a driven member having a selector connected for rotation therewith but slidable therealong, an intermediate member, coupling means for connecting the driving member and the intermediate member, a low-speed high-torque train connecting the driving member and the driven member and including an over-running clutch for effecting rotation of the selector when the torque demand on the driven member is less than the torque transfer through the coupling member, first clutch means on the intermediate member, second clutch means on the driving member, third clutch means on the selector member, and means for shifting the selector from a first position in which said clutch means are disengaged from one another to a second position in which said first and third clutch means are engaged together and thence to a third position in which said third clutch means is engaged with both said first and second clutch means.

7. A transmission system as in claim 6, in which the low-speed high-torque train includes a revoluble gear mounted on the selector and connected therewith through the over-running clutch, and also including a reverse train connected for driving from the driving member and having a gear for meshing engagement with said revoluble gear in a fourth position of the selector in which said first, second and third clutch means are disengaged from one another.

8. A transmission system as in claim 6, in which the coupling means is a hydraulic coupling responsive to the speed of rotation of the parts thereof.

9. A transmission system comprising a fluid fly-wheel having a housing and a runner, means for driving the housing, a tail shaft, a low-speed high-torque train connecting the housing and the tail shaft and including an over-running clutch, and selectively operable means effective in one position to connect the tail shaft to the runner and effective in another position to connect the tail shaft directly to the housing.

10. A transmission system comprising a fluid fly-wheel having a housing and a runner, means for driving the housing, a tail shaft, a low-speed high-torque train connecting the housing and the tail shaft and including an over-running clutch, and selectively operable means effective in one position to connect the tail shaft to the runner whereby a high-speed drive of the tail shaft may be automatically effected through the fluid fly-wheel when the torque demand on the tail shaft is less than the effective torque transfer through the fly-wheel, and effective in another position to connect the tail shaft directly to the housing for causing the parts to turn at the speed of the driving means, and effective in a third position for disconnecting the tail shaft from both the runner and housing whereby the tail shaft is driven solely through the said train.

11. A transmission system comprising a driving member, a driven member, a fluid fly-wheel having two relatively movable parts of which one is connected to the driving member and the other is connectable to the driven member, a low-speed high-torque gear train connecting the driving and driven members and including a small gear connected to said one part of the fluid fly-wheel and including also a gear means and an over-running clutch through which said gear means is effective to produce a driving of the driven member at low speed, a selector body connected for rotation with said driven member and slidable therealong, clutch teeth on said selector body and on each of said parts of the fluid fly-wheel, and a reverse gearing device including a gear in mesh with said gear train and a gear connected to said selector body; said selector body being slidable for selective engagement in a first position in which said gear means is in mesh to be effective for driving the driven member at a low speed, and in a second position in which said gear on the selector body is in mesh for being driven through said reverse gear, and further being selectively slidable while said gear means remains in mesh into a third position in which said clutch teeth on the selector body and said other part of the fluid fly-wheel are engaged and also into a fourth position in which said clutch teeth on the selector body and on said one part of the fluid fly-wheel are engaged.

OTTO E. SZEKELY.